(12) United States Patent
Schlaff

(10) Patent No.: US 8,441,533 B2
(45) Date of Patent: May 14, 2013

(54) TWO-WAY COMMUNICATION SYSTEM WITH INTEGRAL CAMERA LENS

(75) Inventor: Steven Schlaff, Woodmere, NY (US)

(73) Assignee: Norcon Communications, Inc., Inwood, NY (US)

( * ) Notice: Subject to any disclaimer, the term of this patent is extended or adjusted under 35 U.S.C. 154(b) by 2927 days.

(21) Appl. No.: 10/185,395

(22) Filed: Jun. 28, 2002

(65) Prior Publication Data

US 2004/0001141 A1    Jan. 1, 2004

(51) Int. Cl.
     *H04N 7/18*      (2006.01)

(52) U.S. Cl.
     USPC ......................................................... 348/143

(58) Field of Classification Search .......... 348/143–179, 348/14; 379/420.03; 109/10; 340/574; 396/2; *H04N 7/18*
See application file for complete search history.

(56) References Cited

U.S. PATENT DOCUMENTS

| | | | |
|---|---|---|---|
| 4,049,911 A * | 9/1977 | Schlaff et al. | 379/420.03 |
| 4,524,384 A * | 6/1985 | Lefkowitz et al. | 348/156 |
| 4,843,461 A * | 6/1989 | Tatsumi et al. | 348/156 |
| 5,428,388 A * | 6/1995 | von Bauer et al. | 348/155 |
| 5,612,732 A * | 3/1997 | Yuyama et al. | 348/14.01 |
| 5,897,220 A * | 4/1999 | Huang et al. | 396/2 |
| 5,940,486 A | 8/1999 | Schlaff | |
| 5,970,888 A * | 10/1999 | Sheppard | 109/10 |
| 6,094,213 A | 7/2000 | Mun et al. | |
| 6,194,244 B1 * | 2/2001 | Yamaguchi et al. | 438/57 |
| 6,292,211 B1 * | 9/2001 | Pena | 348/14.08 |
| 6,335,753 B1 | 1/2002 | McDonald | |
| 6,429,893 B1 * | 8/2002 | Xin | 348/155 |
| 6,559,769 B2 * | 5/2003 | Anthony et al. | 340/574 |

* cited by examiner

*Primary Examiner* — Tung Vo
(74) *Attorney, Agent, or Firm* — Leason Ellis LLP

(57) ABSTRACT

A bi-directional communication system is provided for mounting to a partition (e.g., a glass partition or a partition formed of a bullet-resistive material). The system is a self-contained system and is formed of several parts that mount together to form the assembled system. The system is not only a two-way, hands-free audio system that includes working audio components that deliver high-quality audio communication between people separated by the partition (i.e., a security or isolation barrier) but also the system provides high-quality video communication. The video communication is provided by a micro video camera that can be disposed on either or both sides of the partition.

28 Claims, 6 Drawing Sheets

FRONT

CONTROL PANEL

REAR

TWO-WAY COMMUNICATION SYSTEM WITH INTEGRAL CAMERA LENS

TECHNICAL FIELD

The present invention relates generally to talk-through units, and more particularly to talk-through units that are completely self-contained, simple to install, and are under the exclusive and hands-free control of an "inside" attendant and also constructed to offer additional safety features by having an integral camera lens.

Background

There are many situations in which voice communications must be accomplished through a partition (usually the partition is transparent, although it does not have to be). For example, a partition formed of glass or some other type of material usually separates a ticket seller in a theater from members of the public who desire to purchase tickets. Communication systems having this type of partition are used in a number of other settings where safety is to be provided between the attendant and members of the public. For example, many gas stations have attendant booths and transactions are made between the attendant and a member of the public through a partition that has a communication system incorporated therein. This is especially the case at night when the employer wishes to provide to the attendant as safe a work environment as possible.

The communication system that is typically incorporated into the partition is often referred to as a talk-through unit which is designed to amplify voice communication in both directions. One type of communication system that offers a number of advantages is a self-contained talk-through unit of the type disclosed in U.S. Pat. No. 4,049,911 to Schlaff et al., which is hereby incorporated by reference in its entirety. This type of communication system includes a powered unit that is easily mounted in a circular cutout in a window or other partition. A microphone and speaker are mounted within the unit facing the outside, while a separate speaker is mounted within the unit facing the inside. An inside microphone is contained at the end of a gooseneck or other elongated connector which comprises part of the overall housing. At any single instant of time, there is amplification of the voice signal in only one direction. In the quiescent condition, the amplification is from outside to inside. This permits the attendant to monitor what is going on outside of the booth where the communication system is installed. The voice signal from outside to inside is level-compressed, that is, the speech which the attendant hears is at more or less constant level no matter how loud the voice of the outside customer. A control knob permits the attendant to select this level. Another control knob is provided to vary the inside-to-outside amplifications.

When the attendant desires to talk, the attendant moves his/her head so that the mouth is within a predetermined distance (e.g., 2 inches) of the gooseneck microphone. As soon as a signal is detected, the outside-to-inside amplification is shut off, and the inside-to-outside amplification is turned on. At this juncture, the attendant has complete control over the communications. The operation is entirely hands-free, and it is a normal reaction for a person to move his/her mouth in proximity to a microphone when he/she desires to talk. The system is provided with a threshold adjustment which determines the signal level at the inside microphone which controls a switch from outside-to-inside amplification to inside-to-outside amplification. This initial adjustment allows the attendant to tailor the automatic switchover to his/her own operating procedures and voice level, and the acoustic characteristics of the booth.

In today's ever changing world, it is desirable to provide a safe work environment for one's employees, especially those employees that work within security and isolation booths. While two-way communication systems have advanced in terms of providing high-quality audio communication between people separated by security or isolation barriers, additional security features may be desirable to provide not only audio monitoring/recording of the communications but also video monitoring/recording of the communications. Video surveillance cameras are used in a variety of settings to provide an extra level of security that can actually cause crime to be averted and can also provide additional peace of mind to attendants that work within security and isolation booths. For example, many convenience stores have some level of video surveillance and most automatic teller machines have built-in video surveillance devices.

One of the disadvantages of many video surveillance devices (especially the type incorporated into automatic teller machines) is that they provide a limited line of sight (field of view) due to the positioning of the camera lens, etc. In other words, the devices are able to view only the person that is immediately in front of the automatic teller machine at the keypad terminal thereof and many times, the camera angle only provides a side image of the person instead of capturing the complete face of the person. Unfortunately, this field of view may be too limited as it is desirable to capture the complete face of the person that is immediately in front of the automatic teller machine. In this situation, the limited field of view of the camera may not provide any useful information since the device may not capture the true identity of a wrong-doer since the camera angle may only provide a shot of the side of the person's face or worse yet, the positioning of the person may be such that the only image obtained is an image where the person's face is obscured by his/her hair, a hat, etc. It is therefore desirable to expand the field of view of the surveillance device and also position the camera so that the person's face is captured. Further, it is often times desirable to catch the identity of persons behind the person immediately in front of the talk-through device and unfortunately, the camera angle of conventional surveillance devices prevents this from happening.

Thus, there is a need in the art for a simple, self-contained system that not only provides a talk-through communication device that has the ability to monitor and/or record audio communications but also has the added security feature of video surveillance.

SUMMARY

A bidirectional communication system is provided for mounting to a partition (e.g., a glass partition or a partition formed of a bullet-resistive material). The system is a self-contained system and is formed of several parts that mount together to form the assembled system. One exemplary system in accordance with the invention has a first part (e.g., an annular plate) that is mounted on an exterior side of the partition and second and third parts which are mounted on the opposite interior side of the partition. The second part can be in the form of an annular plate that is securely mounted to the first part through the partition, while the third part can be a housing that contains many of the working components of the system and which is securely mounted to the second part.

The system is not only a two-way, hands-free audio system that includes working audio components that deliver high-quality audio communication between people separated by the partition (i.e., a security or isolation barrier) but also the system provides high-quality video communication. The video communication is provided by a micro video camera that can be disposed on either or both sides of the partition. In a preferred embodiment, the micro video camera includes a lens module having at least one lens that is disposed within the first part on the exterior side of the partition and a control module that is disposed at least partially within the third part on the interior side of the partition. In another embodiment, both the lens module and the base control module are disposed in the first part on the exterior side of the partition. The lens module generates a data signal that is delivered to the control module which further processes or converts this data signal into a signal that can be recorded and/or displayed on a device, such as a monitor. The control module is preferably in communication with another device, such as a video recorder and/or video monitor or display. This communication can be of the wireless type.

It will be appreciated that the present system is still self-contained as both the lens module and the control module are conveniently disposed within one or more parts of the system. This provides many advantages with one being that the system operates in a hands-free manner.

Other features and advantages of the present invention will be apparent from the following detailed description when read in conjunction with the accompanying drawings.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF PREFERRED EMBODIMENTS

Figure 1:
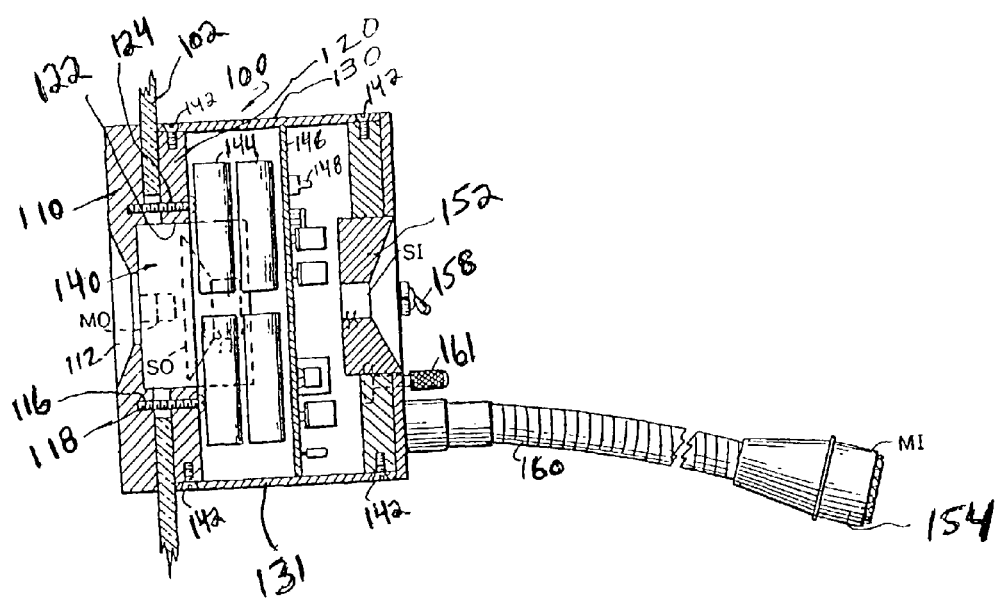
FIG. 1 is cross-sectional view of a conventional communication system.
Figure 2:
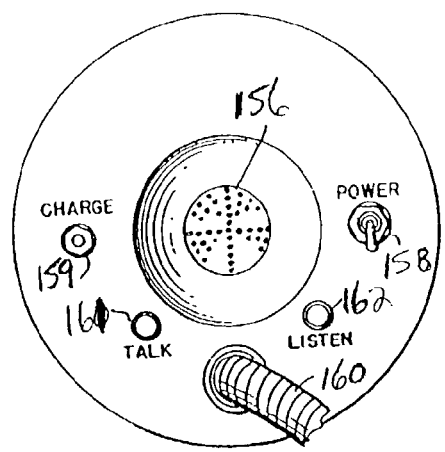
FIG. 2 is rear elevational view of the communication system of FIG. 1.
Figure 3:
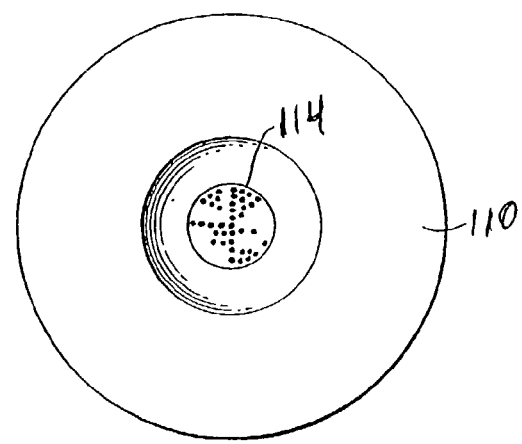
FIG. 3 is a front elevational view of the communication system of FIG. 1.

As discussed above, one exemplary two-way communication system is disclosed in U.S. Pat. No. 4,049,911, which has been previously incorporated herein. The two-way communication system 100 disclosed in FIGS. 1 through 3 is similar to the one disclosed in U.S. Pat. No. 4,049,911; however, this is for purpose of illustration and does not limit the scope of the present communication system 100 in anyway. The exemplary communication system 100 is formed of three major components or parts which permit rapid mounting to a partition or other support. More specifically, the first part is an outer part 110, the second part is an inner plate 120, and the third part is a housing 130 that contains many of the working components of the system 100.

The outer part 110 is preferably a circular plate with a central cut out 112 and a perforated grill 114. While, the central cut out 112 can be formed to have any number of shapes, the central cut out preferably has a conical shape. The outer part 110 also preferably has a number of mounting openings 116 formed therein to receive fasteners 118 for securely attaching the various components to one another.

The inner plate 120 is simply a circular plate with a central cut out 122 and a number of mounting openings 124 to permit the fasteners 118 to extend completely therethrough. The number of mounting openings 124 should equal the number of mounting openings 116. In addition, the mounting openings 124 should align with the mounting openings 116 when the inner plate 120 and the outer part 110 are assembled during the mounting of the system 100. Unlike the mounting openings 116, the mounting openings 124 extend completely through the inner plate 120.

The first step in mounting the system 100 is to place the outer part 110 on an exterior side 101 of a partition 102, while the inner plate 120 is placed on an interior side 103 of the partition 102. The partition 102 contains a cut out 104 made for the purpose of the installation of the system 100. The partition 102 is also constructed to accommodate the fasteners 118 which extend through the partition 102 for securely attaching the inner plate 120 to the outer part 110 on opposite sides of the partition 102.

The housing 130 contains the working elements of the system 100. The housing 130 is fitted against the inner plate 120 with an outside microphone/speaker assembly 140 inserted through the cut-out 122 formed in the inner plate 120 and the cut out 104 formed in the partition 102. In FIG. 1, the symbol "MO" represents the "outside microphone" and the symbol "SO" represents the "outside speaker". According to one exemplary embodiment, the housing 130 has a cylindrical sleeve 131, the end of which fits over the inner plate 120. Fasteners 142 (e.g., screws) are used to secure the cylindrical sleeve 131 to the inner plate 120, thus completing the installation of the system 100. The attachment between the housing 130 and the inner plate 120 is on the interior side 103 of the partition 102. In alternative arrangements, the housing 130 can be mounted to the outer part 110 without the need for inner plate 120.

In one embodiment, the system 100 is a battery-operated system with a predetermined number of batteries 144 being disposed within the housing 130. For example, the batteries 144 can be formed of ten 1.25-volt batteries. These batteries 144 are mounted in two planes with each plane containing five batteries which are arranged around the periphery of the unit in the shape of a pentagon. The batteries 144 are connected in series (not shown) in order to provide a 12.4-volt supply.

Alternatively, the system 100 is supplied with a continuous-duty 117-volt power supply which is stepped down to 15 volts. Preferably, the power source is fully contained within the system 100 and, more specifically, within the housing 130. A power source of this type is known in the two-way communication device art and therefore, will not be described in any great detail. It will therefore be appreciated that any number of power source arrangements can be provided which are configured to be contained internally within the system 100.

A circuit board 146 is also preferably mounted within the housing 130. The circuit board 146 contains the various electrical components included in the system 100. The detailed mounting of the components of the board 146 is not critical for an understanding of the operation of the present system 100, and therefore, FIG. 1 is designed to depict the overall arrangement, rather than the structural details. The circuit board 146 does include a potentiometer 148 mounted thereto. This potentiometer 148 serves as the threshold adjustment. Access to the potentiometer 148 is gained by removing fasteners 149 (e.g., screws) which secure the sleeve 131 to a front plate assembly in the system 100. By removing the front plate assembly, the potentiometer 148 can be adjusted.

On the inside of the housing 130, an "inside speaker" 152 is mounted. An inside microphone 154 is secured at the end of a gooseneck connector 160 which has a predetermined length (e.g., 12 inch or 18 inch). In general, microphone 154 is preferably mounted at least several inches (i.e., three inches) in front of the speaker 152. On the inside face of the housing 130 (as is most clearly seen in FIG. 2), there are provided a grill 156 for permitting sound from speaker 152 to pass through, a main power switch 158 and a charging jack 159 for allowing the batteries to be recharged when system 100 includes batteries 144. A conventional charging circuit (not shown) can be used with the system 100, the batteries being charged overnight when the system may not be in use. The speaker and microphone for use on the interior side of the partition can comprise a headset of conventional design instead of inside speaker 152 and inside microphone 154 being mounted to or within the housing 130.

The housing 130 also has a number of control features that are mounted thereto. For example, two potentiometer control knobs 161, 162 can be mounted on the inside face of the housing 130. The control knobs 161, 162 are for respectively adjusting the voice level on the outside of the unit (talk) and the inside of the unit (listen).

The specific manner in which exemplary working components of the system 100 operate, including detailed block diagram schematics showing the relationship between the working components, is set forth in great detail in the '911 patent, which has been previously incorporated herein. For example, the '911 patent discloses detailed schematics illustrating several exemplary circuits (including integrated circuit structures) that can be used in the system 100. It will be understood that the system 100 can be fabricated in the same or similar manner as disclosed in the '911 patent or other configurations for the working components that are known in the art are possible so long as the working components perform their stated functions. For example, U.S. Pat. No. 5,940, 486, assigned to the present assignee and which is incorporated herein by reference in its entirety, discloses a two-way communication system with selective muting. It will be understood that the present system 100 can incorporate the functionality that is disclosed in the '486 patent. In other words, the working components that are disposed in the housing 130 can be configured according to the disclosure of the '486 patent to provide a two channel communication system wherein external background noises are automatically reduced to eliminate discomfort to the attendant.

The above described working components and their arrangements, as disclosed in the '911 patent and/or the '486 patent, are merely exemplary in nature and it will be appreciated that the working components can be arranged differently and/or different working components can be used so long as the system 100 provides a working talk-through unit for passing voice communications through a partition of a wall.

Now referring to FIGS. 4-8 in which an exemplary two-way communication system 200 is illustrated in accordance with one embodiment. Many of the working components of the system 200 are similar as those contained in the system 100 of FIGS. 1-3 and therefore like components are numbered alike and will not be described in great detail. However, the communication system 200 is not limited to any of the components or the general design of the system 100 and therefore, it will be understood that the system 200 can comprise any number of different types of communication systems besides the one disclosed in U.S. Pat. No. 4,049,911.

One difference between the present system 200 and the conventional system 100 is that the system 200 provides an extra level of security in that it includes a micro video camera, generally shown at 300, that is incorporated into the system 200 so that it, like the other working components, is self-contained within the system 200. Because the present communication system 200 is configured to provide not only two-way audio communication but also provides video surveillance and therefore, an outer part 210 is configured differently from outer part 110 of the system 100 of FIGS. 1-3. Outer part 210 is configured to accommodate not only the micro video camera 300 but also the other working components, such as an outside microphone 220 and an outside speaker 230.

Figure 4:
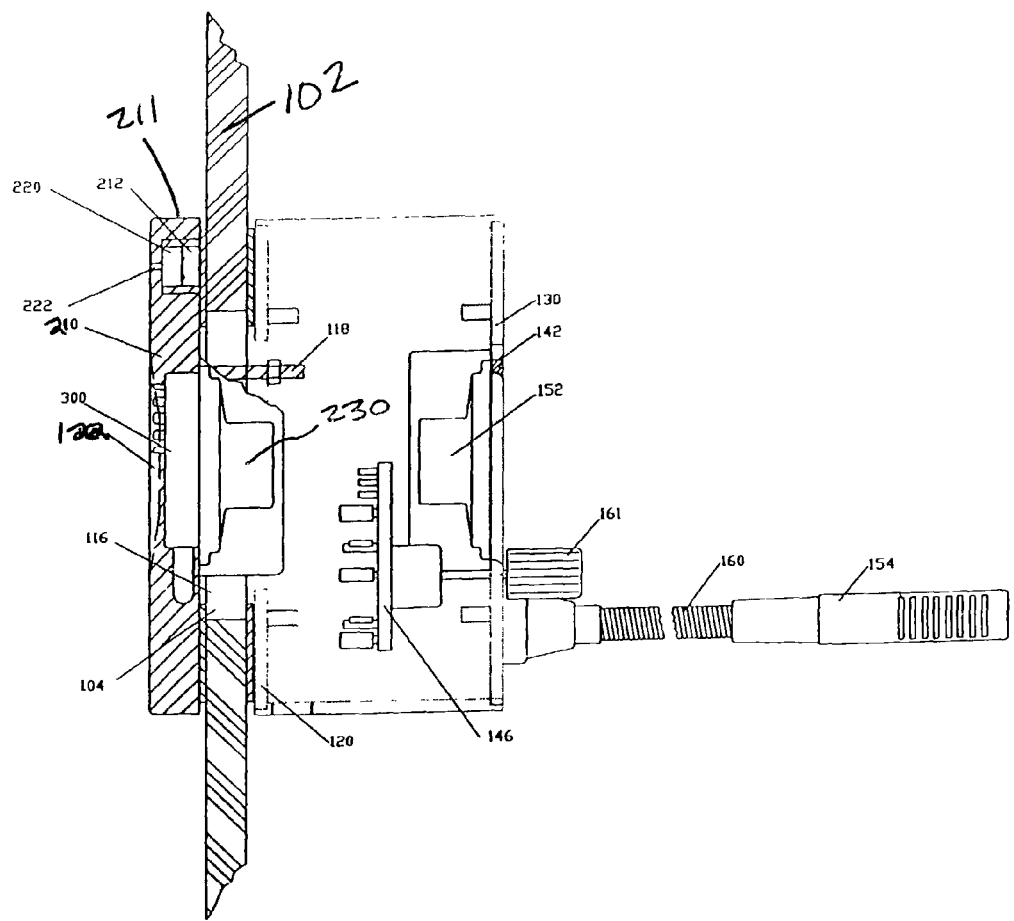
FIG. 4 is a cross-sectional view of a communication system providing high-quality audio and video communication according to one exemplary embodiment.
Figure 5:
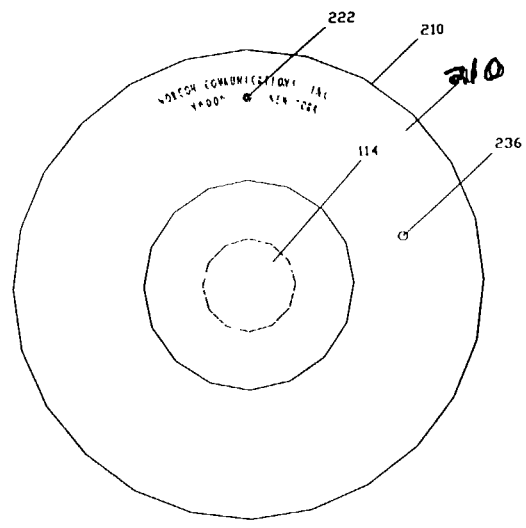
FIG. 5 is an elevational view of a front face of an outer part of the communication system of FIG. 4.
Figure 7:
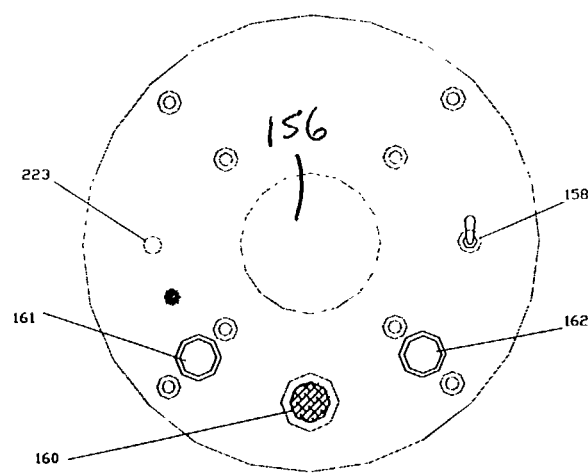
FIG. 7 is an elevational view of a rear face of a housing of the communication system of FIG. 4.
Figure 6:
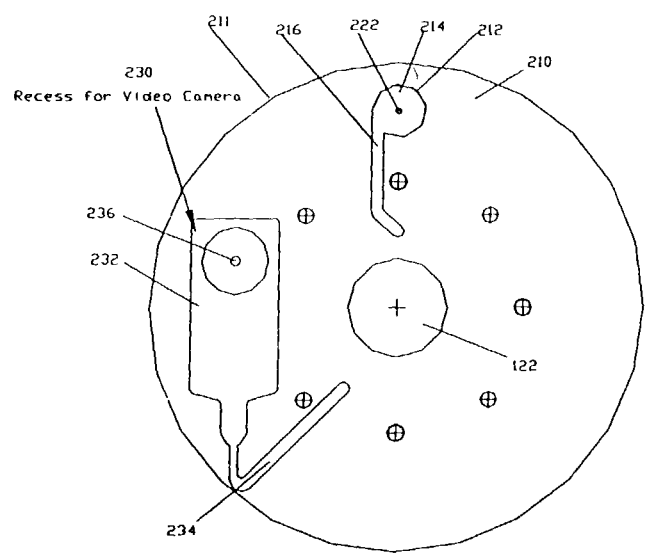
FIG. 6 is an elevational view of a rear face of the outer part of FIG. 5.
Figure 8:
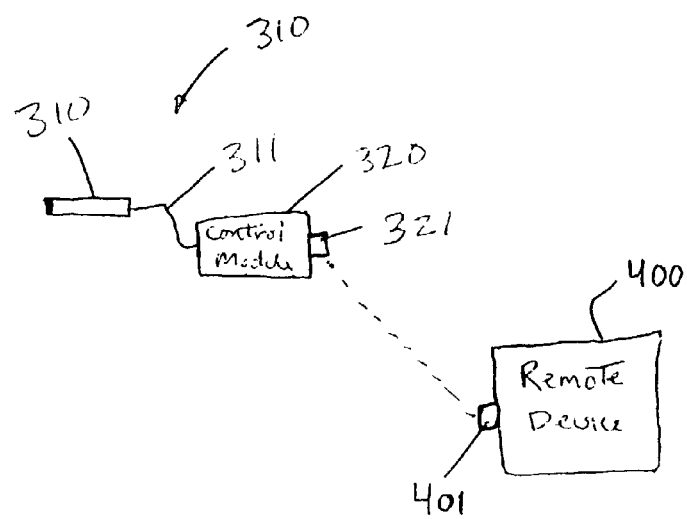
FIG. 8 is a schematic diagram of the communication between a micro video camera and a remote device.

FIG. 5 is an elevational view of a front face of the outer part 210 and FIG. 6 is an elevational view of a rear face of the outer part 210. According to this embodiment, the outside microphone 220 is spaced from the outside speaker 230 and is contained within a cavity 212 formed in the outer part 210. The cavity 212 is formed in the rear face of the outer part 210 and includes a main section 214 and an elongated slot 216 extending from the main section 214. The main section 214 houses the larger components of the outside microphone 220 and the elongated slot 216 houses cables or the like that connect the outside microphone 220 to other working components disposed in the housing 130. The main cavity section 214 does not extend completely through to the front face of the outer part 210 and is also preferably formed in the outer part 210 so that the main section 214 seats against the partition 102 when the system 200 is assembled, as illustrated in FIG. 4. The main cavity section 214 does include a bore 222 that is formed through the outer part 210 to the front face thereof. A portion of the outside microphone 220 is preferably disposed within the bore 222 to pickup communications of a person standing in front of the device 200. In the illustrated embodiment, the bore 222 is circular shaped and is located close to an outer peripheral edge 211 of the outer part 210 with the elongated slot 216 extending radially inwardly toward the central cut out 122 of the outer part 210.

The outer part 210 also has a cavity 230 formed therein for receiving the micro video camera 300 and providing communication between the micro video camera 200 and the other working components of the device 200. Similar to the cavity 212, the cavity 230 includes a main section 232 that receives either entire micro video camera 300 or at least major components thereof and an elongated slot 234 that extends outwardly from the main section 232. The slot 234 is configured as a slot for carrying cables and the like from the major components of the micro video camera 300 to the other working components of the device 200. The slot 234 terminates at an end which is disposed near the central cut out 122 of the outer part 210. Slot 234 thus provides a route for cable to be fed from the micro video camera 300 to an external location. For example, the entire micro video camera 300 can be disposed within the main section 232 and a cable from the micro video camera 300 can be fed through the slot 234 and through the housing and then to a location external from the device 100 (e.g., a monitor in a back room).

The main section 232 and the elongated slot 234 do not extend completely through to the front face; however, a video opening (bore) 236 is formed in the main section 232 and extends completely through to the front face to permit the video surveillance device (micro video camera 300) to view persons in front of the outer part 210. In the exemplary embodiment, the video bore 236 has a circular shape and is disposed radially outside of the central cut out 122. Accordingly, the main cavity section 232 permits the video surveillance equipment (e.g., the micro video camera 300) to be disposed on an external side of the partition 102. Because the open cavity sections of the rear face of the outer part 210 receive the micro video camera 300, the components of the micro video camera 300 can easily communicate with other working components in the housing 130. The system 200 also includes the power source (continuous-duty 117-volt power supply), as previously mentioned, and also can include a jack 223 for a headset or the like.

According to one exemplary embodiment, the micro video camera 300 preferably is a micro sized product that utilizes digital signal processing (DSP) technology and charge-coupled device (CCD) technology for image capture. Such a device can be referred to as a DSP CCD micro camera. As with most DSP CCD micro camera devices, the exemplary micro video camera 300 includes a micro head or lens module 310 and a base control module 320 that can be remote from the lens module 310 or can be connected thereto by a cable or the like or lens module 310 can form a part of the control module 320. With the recent technological advancements in this area, the dimensions of the lens module 310 can be quite small, permitting the lens module 310 to be very compact and be easily disposed in a great number of locations. As will be described in greater detail hereinafter, the data signal produced by the lens module 310 is carried by a cable 311 to the base control module 320. When the lens module 310 and the base control module 320 are formed as a single integral part, the data signal is simply transferred from the lens module 310 to the base control module 320 using conventional means, such as wires or other signal pathways.

One exemplary lens module 310 includes a lens design that is of the type commonly known as a pinhole type lens due to the small dimensions of the lens. Micro video cameras 300 are commercially available from a number of different manufacturers and it will be appreciated that any number of suitable micro video cameras 300 can be selected so long as each can perform the intended functions disclosed herein. In one exemplary embodiment, the lens module 310 has a lens that has the following properties: F3.5 and a focal length (f) of 3.7 mm. The lens module 310 is thus effectively the lens for the micro video camera 300 and is preferably dimensioned so that it can be disposed and stored at least partially within the video bore 236 of the outer part 210 or in close proximity thereof so long as it is capable of capturing the desired images. Alternatively, the micro video camera 300 can be arranged so that the lens module 310 faces the video bore 236 as the video camera 300 sits within the main section 232. In other words, the lens can be arranged so that it is positioned immediately adjacent the inner end of the bore 236 so that the lens faces the bore 236 and has a line of sight through the bore 236 to permit image capturing of objects in front of the device 100.

As best shown in FIG. 5, a front view of the outer part 210 which is the view that a customer will see, illustrates that the video bore 236 defines a small opening that is formed near the grill 114. The lens of the lens module 310 is preferably of the type that will offer an expansive view angle despite its compact size. For example, the view angle of one exemplary pinhole lens that is suited for use in the lens module 310 has the following view angle characteristics: D:68°; H:54°; and V:40°. The lens module 310 is preferably designed such that images of the face of the person immediately in front of the outer part 210 are captured and in addition, the lens module 310 can be configured so that it is able to capture images of persons that may be behind the person who is immediately in front of the outer part 210 or otherwise around the person who is immediately in front of the outer part 210. In other words, the field of view characteristics of the lens within the lens module 310 and the manner in which the lens module 310 is arranged within the bore 236 are such that the lens module 310 captures images of people and objects that are in the general vicinity of the outer part 210. More specifically, the lens module 310 successfully captures a full frontal face image of the person in front of the lens module 310 since the person has to speak into the microphone that is positioned near the bore of the lens module 310 and during this action, the person positions his/her within the direct field of view of the lens module 310.

In the illustrated embodiment, the lens module 310 communicates with the base control module 320 via a cable 311 which can extend through the bore 236 of the outer part 210. The base control module 320 is typically disposed at least partially outside of the outer part 210 and can be disposed at least partially within the interior of the housing 130 and includes a commercially available CCD control module which is compatible with the lens module 310. The CCD control module processes or converts the digital format signal of the lens module 310 into a signal that can be further processed or viewed. For example, the digital format signal can be processed or formatted into a signal that can then be delivered to another device (i.e. a digital or analog monitor input) which permits the video images to be viewed. Furthermore, the digital format signal can be transformed into a predetermined format, for example, for communication to a video recorder module. This type of arrangement permits the signals to be continuously stored on tape media, such as a video cassette, or on a diskette, optical disk, and so on.

When it is desired for the base control module 320 to transfer formatted signals to a remote device or module 400 (FIG. 8) for monitoring and/or recording the images, a wireless communication arrangement can be provided to permit the system to function. For example when a video recorder module 400 is used and provided in communication with the base control module 320, transceivers 321, 401 can be provided in each of the base control module 320 and the video recorder module 400, respectively. By incorporating transceivers 321, 401 into the base control module 320 and the video recorder module 400, a wireless communication path can be provided between the base control module 320 and the video recorder module 400. This permits the base control module 320 to be conveniently disposed within the housing 130, while the video recorder module 400 can be located at a location remote to the base control module 320. It will also be understood that the transceiver 321 disposed in the base control module 320 can communicate with a transceiver disposed in another device, besides a video recorder module, if it is not desired for the images to be recorded. Suitable transceivers include the 2.4 GHz wireless devices commercially available from X10 (USA) Inc., N. Las Vegas, Nev., and suitable video camera 300 and video controller module 400 include the XC18A 2.4 GHz Wireless Color Camera and UR31A 2.4 GHz Wireless Audio/Video Receiver, also of X10 (USA) Inc.

Preferably, the base control module 320 or another control module of the system 200 is in communication with a monitor or the like (e.g., remote device 400) for video-playback of the events that are being observed and/or recorded by the micro video camera 300. For example, the monitor can be located in the vicinity where the attendant is positioned or can be located at a central location, such as a manager's office or a central security office.

It will thus be appreciated that the components forming the micro video camera 300 can be disposed on opposite sides of the partition 102 in that the lens module 310 is disposed on the exterior of the partition (glass) 102 within the outer part 210 itself, while the base control module 320 is at least partially disposed on the interior of the partition 102. Alternatively and as illustrated in FIG. 4, the entire micro video camera 300 is disposed within the outer part 210 on the exterior of the partition 102. More specifically, the lens module 310 and the base control module 320 are entirely disposed within the main section 232 which is formed in the outer part 210 (external side of the partition 102). The configuration of the micro video camera 300 preferably permits it to conveniently be installed in the existing system 200 without major retrofitting or requiring a greater number of changes to be done. By placing the active lens part (lens module 310) of the micro video camera 300 on the exterior side of the partition 102, high-quality video communication is provided between a person(s) that is separated from the attendant by the partition 102.

Another advantage is that the design of the micro video camera 300 permits easy retrofitting of the system 200 in that a conventional system, such as system 100, can easily be modified to incorporate the micro video camera 300. For example, retrofitting may only require that the bores and cavities be formed in the outer part 210 and some modification of the housing 130 may be required in order to receive and store the other working components of the micro video camera 300 (i.e., the base control module 320). Yet another advantage of the present construction is that by having the micro video camera 300 self-contained in the system 200, the micro video camera 300 can be readily upgraded since all that is required to accomplish this is to disassemble the system 200 by separating the housing 130 from the inner plate 120 and separating the outer part 210 from the inner plate 120. The various components of the micro video camera 300 can then be accessed; removed; and then upgraded. Thus, an installer can retrofit an existing talk through device to add video surveillance capability free of making a new or larger cutout 104 in the partition.

It will also be appreciated that the micro video camera 300 and the system 200 preferably communicate with a master control unit that receives the audio signals from the system 200 and also receives the video signals from the micro video camera 300 or another video module that that is designed to transfer the images from the micro video camera 300 to the master control unit. The master control unit is preferably configured so that the audio signals and the video signals are received and indexed relative to one another so that during a playback of the recorded video images, the audio signals are matched to the video signals. This indexing can be achieved, for example by digital marking at prescribed moments (e.g., at 30 second intervals, when the interior/exterior microphone goes active, etc.)

It will be understood that the above described micro video camera 300 is merely exemplary in nature and any number of other devices may be used so long as these devices are able to be self-contained within the system 200 and provide the desired functionality (i.e., high quality video images that can be monitored and/or recorded). Further, the device can be constructed so that the camera head (lens) can be disposed on one side of the partition 102 and the other working components of the device can be disposed on the other side of the partition 102 but still self contained within the system 200. In this way, expensive components are less vulnerable to vandalism by being positioned on the interior side of the partition 102.

The system 200 therefore provides not only high-quality audio communication that can be output to permit monitoring and/or recording of the audio communication but also, the micro video camera 300 provides high quality video images that can be monitored and/or recorded. This provides an extra level of security to those settings where voice communications must be accomplished through a partition and actually works as a deterrent to crime or other wrongdoing being perpetrated by a person dealing with the attendant.

It will be understood that the components forming the system 200 are constructed of materials that are commonly used in talk-through devices. Such materials are commonly metals and it will further be appreciated that the system 200 can be constructed so as to offer bullet proof resistance. In this embodiment, components that can be in the line of fire (e.g., the outer part 210 including the grill 114) are formed of materials that have bullet resistive characteristics. The level of security, including the bullet resistance characteristics, that is provided by the system 200 can be tailored to the individual needs of the user.

While the invention has been particularly shown and described with reference to preferred embodiments thereof, it will be understood by those skilled in the art that various changes in form and details may be made therein without departing from the spirit and scope of the invention.

What is claimed is:

1. A bi-directional communication system for providing communication between two points on opposite sides of a partition, the system comprising:
   a unit adapted for mounting on the partition and including:
      a first part for placement on an exterior side of the partition, the first part having a first bore extending therethrough; and
      a second part for placement on an interior side of the partition and securely attached to the first part;
      audio communication components disposed at least partially within at least one of the first and second parts to permit bi-directional audio communication between the two points on opposite sides of the partition; and
   a micro video camera including a lens module having at least one lens disposed therein and a control module in communication with the lens module, the lens module and the control module being disposed within the first part on the exterior side of the partition, the first part having an inner face and an opposing outer face that faces away from the second part, the inner face having a contoured first recessed cavity formed therein and defined by a solid floor that defines a bottom of the cavity for receiving and containing the micro video camera so as to position the micro video camera on the exterior side of the partition, the micro video camera seated within the first recessed cavity such that it is disposed in intimate contact with and against the solid floor of the first recessed cavity so as to contain and hold the micro video camera in a desired location, wherein within the first cavity, the first bore is formed completely through the first part and the lens module is at least partially disposed in the first bore.

2. The bi-directional communication system of claim 1, wherein the second part includes an inner circular plate and wherein the first part includes an outer circular plate that is mountably secured to the inner circular plate.

3. The bi-directional communication system of claim 1, wherein the audio communication components include a first speaker and a first microphone contained within the unit and facing in a first direction for audio communication to and from the exterior side of the partition and a second speaker and a second microphone associated with the unit and facing in a second direction for audio communication to and from the interior side of the partition.

4. The bi-directional communication system of claim 1, wherein the unit includes a third part disposed between the first part and the interior side of the partition, the third part being securely mounted through the partition to the second part on the opposite exterior side of the partition.

5. The bi-directional communication system of claim 4, wherein the control module is at least partially disposed on an interior side of the partition and the third part includes an opening formed therethrough to permit the control module to extend to the interior side of the partition.

6. The bi-directional communication system of claim 1, wherein communication between the lens module and the control module is provided through a cable.

7. The bi-directional communication system of claim 1, wherein the at least one lens module comprises a pinhole lens.

8. The bi-directional communication system of claim 7, wherein the pinhole lens comprises a lens with F3.5 and a focal length of about 3.7 mm.

9. The bi-directional communication system of claim 1, wherein the lens module generates a digital format signal that is delivered to the control module which transforms the digital format signal into an analog signal in a prescribed format.

10. The bi-directional communication system of claim 1, wherein the lens module is in wireless communication with a receiver that is remote from the unit.

11. The bi-directional communication system of claim 10, wherein the remote receiver includes an output connectable to at least one of a video recorder and a monitor.

12. The bi-directional communication system of claim 1, wherein the micro video camera comprises a CCD camera.

13. A self-contained talk-through device for providing communication between two points on opposite sides of a partition, the device comprising:
  an assembly having a housing adapted for mounting on the partition and including:
    a first plate for placement on an exterior side of the partition, the first plate having a first bore extending therethrough, the first plate having a first recessed cavity formed in an inner face thereof and defining a solid floor that defines a bottom of the recessed cavity, wherein the first recessed cavity includes a main recessed section and a recessed elongated channel extending from the main recessed section such that one end of the recessed channel forms an entrance into the main recessed section;
    a second plate for placement on an interior side of the partition, wherein an inner face of the second plate includes a control panel that has one or more control features that can be manipulated by a user for operating the system; and
    audio communication components disposed at least partially within at least one of the first and second plates to permit bi-directional audio communication between the two points on opposite sides of the partition;
    a micro video camera disposed within the first recessed cavity and seated in intimate contact against the floor on the exterior side of the partition such that the floor prevents movement of the micro video camera in a direction away from the partition, the micro video camera including a lens module that is disposed in the first bore and is operatively in communication with the control module so that a data signal generated by the lens module is delivered to the control module, wherein an inner face of the video camera extends beyond the partition and into an opening formed in the second plate and a cable of the video camera being disposed within the recessed channel; and
    a power supply contained within the housing of the assembly;
    wherein the audio communication components, the micro video camera, the control module and the power supply are contained within the housing to form the self-contained device.

14. The self-contained talk-through device of claim 13, wherein the first plate comprises an annular plate that has a central cut-out formed therein, the first bore being formed radially outside of the cut-out that receives a grill.

15. The self-contained talk-through device of claim 13, wherein communication between the first component and the control module is established through a cable that is laid within a channel formed in and along the inner face of the first plate such that that the channel opens into the first recessed cavity.

16. The self-contained talk-through device of claim 13, wherein the control module includes a first transceiver that is in communication with a second transceiver disposed within a remote device such that the remote device receives the first signal in a wireless manner.

17. The self-contained talk-through device of claim 13, wherein the data signal comprises a digital format signal.

18. The bi-directional communication system of claim 1, wherein the first part has a contoured second recessed cavity formed therein for receiving and containing at least one of the audio communication components, wherein within the second cavity, an audio bore is formed completely through the first part and at least a portion of the one audio communication component is disposed in the audio bore.

19. The bi-directional communication system of claim 18, wherein the floor of the first cavity surrounds the first bore and a floor of the second cavity surrounds the audio bore and faces the exterior side of the partition.

20. The bi-directional communication system of claim 1, wherein the first recessed cavity includes a base portion defining the floor that receives the micro video camera and an elongated channel that is formed in the inner face and extends from the base portion toward and terminating proximate a central cut out formed completely through the first part.

21. The bi-directional communication system of claim 18, wherein the second recessed cavity includes a base portion defining the floor that receives the at least one audio communication component and an elongated channel that is formed in the inner surface and extends from the base portion toward and terminating proximate a central cut out formed completely through the first part.

22. The bi-directional communication system of claim 18, wherein the first bore and the audio bore are formed radially from a central cut out formed completely through the first part.

23. The bi-directional communication system of claim 1, wherein the micro video camera includes a base control module in addition to the lens module, both of which are entirely disposed in the first recessed cavity on the exterior side of the partition.

24. The bi-directional communication system of claim 1, wherein an inner face of the second part includes a control panel that has one or more control features that can be manipulated by a user for operating the system.

25. The self-contained talk-through device of claim 11, wherein the first plate has a second recessed cavity formed therein and including a floor for receiving and containing at least one of the audio communication components, wherein within the second cavity, an audio bore is formed completely through the first plate and at least a portion of a microphone belonging to the audio communication components is disposed in the audio bore.

26. The self-contained talk-through device of claim 25, wherein the first recessed cavity includes a base portion defining the floor that receives the micro video camera and a first elongated channel that is formed in the inner face, the second recessed cavity including a base portion that receives at least the microphone and a second elongated channel that is formed in the inner face, with both the first and second elongated channels extending from the base portion toward and terminating proximate a central cut out formed completely through the first plate.

27. The self-contained talk-through device of claim 25, wherein the first bore and the audio bore are formed radially from a central cut out formed completely through the first plate.

28. The self-contained talk-through device of claim 13, wherein the micro video camera includes a base control module in addition to the lens module, both of which are entirely disposed in the first recessed cavity on the exterior side of the partition.

* * * * *